(12) United States Patent
Du

(10) Patent No.: US 9,119,072 B2
(45) Date of Patent: Aug. 25, 2015

(54) METHOD AND APPARATUS TO AUTHENTICATE A PERSONAL DEVICE TO ACCESS AN ENTERPRISE NETWORK

(71) Applicant: Intel Corporation, Santa Clara, CA (US)

(72) Inventor: Jianghong Du, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 13/997,701

(22) PCT Filed: Mar. 15, 2013

(86) PCT No.: PCT/CN2013/072725
§ 371 (c)(1),
(2) Date: Jun. 25, 2013

(87) PCT Pub. No.: WO2014/139158
PCT Pub. Date: Sep. 18, 2014

(65) Prior Publication Data
US 2014/0282995 A1     Sep. 18, 2014

(51) Int. Cl.
*G06F 7/04* (2006.01)
*H04W 12/08* (2009.01)
*H04W 12/04* (2009.01)

(52) U.S. Cl.
CPC .............. *H04W 12/08* (2013.01); *H04W 12/04* (2013.01)

(58) Field of Classification Search
CPC .................................................. H04L 63/0807
USPC ........................................................... 726/10
See application file for complete search history.

(56) References Cited

U.S. PATENT DOCUMENTS

2010/0027467 A1* 2/2010 Wu et al. ........................ 370/328
2010/0049975 A1* 2/2010 Parno et al. .................... 713/168

(Continued)

FOREIGN PATENT DOCUMENTS

| CN | 101120569 A | 2/2008 |
|----|-------------|--------|
| CN | 102571766 A | 7/2012 |

(Continued)

OTHER PUBLICATIONS

International Search Report and Written Opinion for International Application No. PCT/CN2013/072725 mailed Dec. 19, 2013.

(Continued)

*Primary Examiner* — Teshome Hailu
(74) *Attorney, Agent, or Firm* — Trop, Pruner & Hu, P.C.

(57) ABSTRACT

In an embodiment, a device includes a processor to initialize a first wireless communication path with a computation device and initialize a second wireless communication path with a secure network, receive a first request for identification data from the secure network via the second wireless communication path to enable access to the secure network, and automatically pass the received request data to the computation device via the first wireless communication path. The processor is further to receive the identification data from the computation device responsive to the request, provide the received identification data to the secure network via the second wireless communication path, and receive session key(s) at the device from the secure network that enables the device to access the secure network. Other embodiments are described and claimed.

20 Claims, 6 Drawing Sheets

(56) References Cited

U.S. PATENT DOCUMENTS

2012/0150687 A1* 6/2012 Hart .................... 705/26.41
2012/0233674 A1* 9/2012 Gladstone et al. ................ 726/6

FOREIGN PATENT DOCUMENTS

| WO | WO 2009138641 A1 | 11/2009 |
|----|------------------|---------|
| WO | 2013/095583 | 6/2013 |

OTHER PUBLICATIONS

U.S. Appl. No. 13/832,556, filed Mar. 15, 2013, entitled "Method and Apparatus to Effect Re-Authentication" by Micah Sheller, et al.

PCT Patent Application Serial No. PCT/US2013/062598, filed Sep. 30, 2013, entitled "Cryptographic Key Generation Based on Multiple Biometrics" by Jiangtao Li, et al.

\* cited by examiner

METHOD AND APPARATUS TO AUTHENTICATE A PERSONAL DEVICE TO ACCESS AN ENTERPRISE NETWORK

TECHNICAL FIELD

The technical field is authentication of a personal device to access an enterprise network.

BACKGROUND

A business entity such as a company may have an enterprise network, e.g., secure network, and/or secure websites that are accessible by employees. The secure network and/or secure websites may be accessible by a stationary computation device or by a portable device.

As BYOD (Bring Your Own Device) to work becomes popular, companies who have authentication methods may wish to authenticate an employee's personal device with an appropriate access level. Some systems to enable the employee to access secure company websites are overly complex for an employee to use.

DETAILED DESCRIPTION

Methods and apparatus to automatically authenticate a portable device (e.g., BYOD) and to grant the portable device access to a secure network level are described. Extensible Authentication Protocol (EAP) is an authorization technique that may be more secure to enable network access than, e.g., use of username/password. EAP-Transport Layer Security (EAP-TLS) is an EAP method that uses Transport Layer Security (TLS) protocol.

EAP uses public key infrastructure (PKI) to secure communication to, e.g., a Remote Authentication Dial In User Service (RADIUS) authentication server or another type of authentication server. TLS implementations of EAP-TLS may include client use of X.509 certificates or other certificates. Each employee typically has a unique identification (ID) in a company and so it can be straightforward to issue a unique certificate for each employee (e.g., by associating the certificate with the employee via the employee ID) and to provision the certificate to the employee's computation device (e.g., laptop computer), e.g., when the company issues the computation device to the employee. The certificate can identify the employee to access company services such as virtual private network (VPN), a company secure website, etc. The certificate can also be used in EAP-TLS to perform wireless authentication that enables access to a related wireless local area network (WLAN) such as an IEEE 802.11 (so-called WiFi™) network.

Based on an EAP-TLS framework, access may be extended by a framework through which an employee's portable device (e.g., a smart phone, tablet computer, Ultrabook™ computer or other portable computing device) can be authenticated so that the employee has an access level for the portable device that is the same access level as the computation device.

Figure 1:
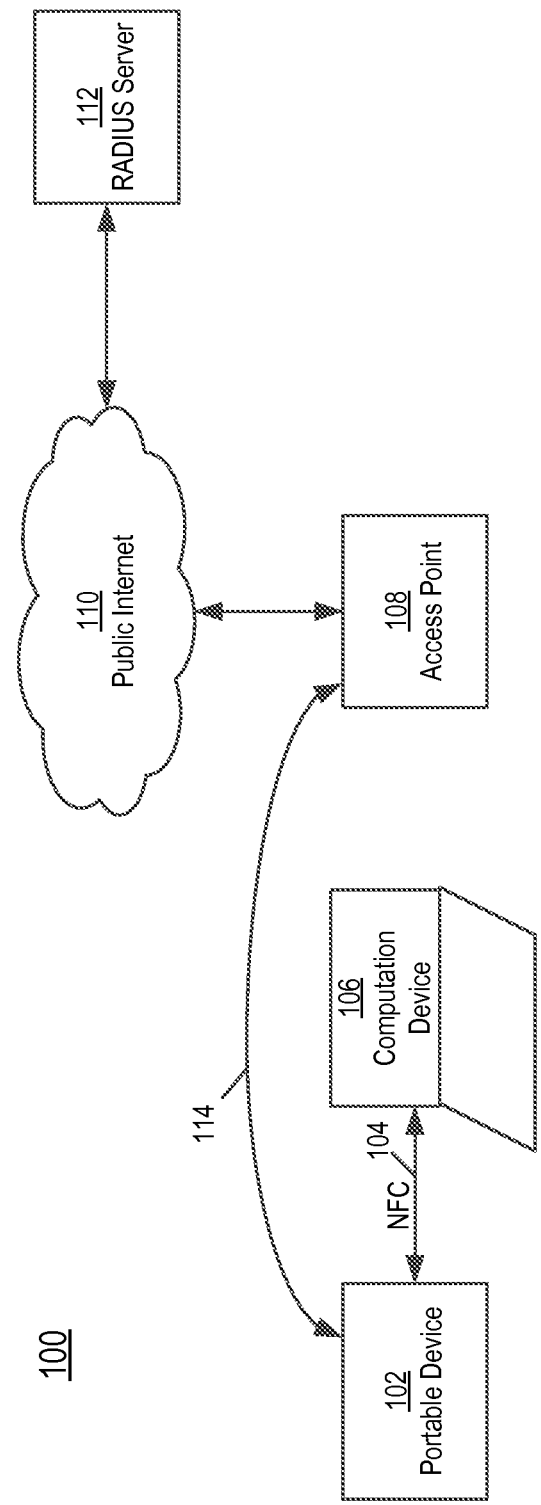
FIG. 1 is a block diagram of a system to authenticate a personal device to access a secure network, according to an embodiment of the present invention.

Referring to FIG. 1, a block diagram of a system 100 to authenticate a personal device to access a secure network is illustrated, according to an embodiment of the present invention. The system 100 includes a portable device 102, such as a smart phone, a communication link 104, a computation device 106 such as a laptop computer ("laptop" herein) or other client system, an access point (AP) 108 that couples to a public Internet 110, and a remote authentication dial in user service (RADIUS) server 112. In other embodiments, other portable devices, computation devices, and/or authentication servers may be used.

In operation, the portable device 102 may initiate communication with the computation device 104 via the communication link 104, which may be a near field communication link, a Bluetooth communication link, or other short range communication system. For example, the communication may be initiated by physical contact of the portable device 102 with the computation device 106 (e.g., tap or bump) that can establish the communication link, e.g., near field communication.

In one embodiment, upon establishment of the communication link 104, the computation device 106 may request a password to be entered by, e.g., a user, in order to verify that the portable device is authorized to request access to the secure network. For example, the user may have brought a smart phone to work and wishes to gain access to the secure network via the smart phone. The user may have been assigned a computation device at work (e.g., a laptop) which may store identification data (e.g., X.509 certificate or other security data) that is accessible by the portable device upon entry of a security code to the computation device, e.g., user password, employee ID, or other security code.

The tap (bump) may, upon indication that the portable device 102 is authorized, trigger automatic launch of an authentication application within the portable device 102. In an embodiment, the authentication application may reside on the portable device 102. For example, the authentication application may have been previously downloaded from a repository of applications such as a company application store. The tap may also trigger initialization of EAP-TLS logic within the computation device.

The portable device 102 can establish wireless contact with the secure network via a wireless path 114 to the access point 108, which is in communication with the RADIUS server 112 via the public Internet 110. The RADIUS server 112 may request security information in order to authenticate the portable device 102 that enables the portable device 102 to access the secure network. The authentication application within the portable device may prompt the computation device 106 to provide to the portable device 102 secure data, e.g., X.509 certificate, which may include secure ID data (e.g., based on an employee ID number associated with the employee).

Upon authentication of the portable device 102 by the RADIUS server 112, the portable device 102 may receive one or more session keys (e.g., unicast key and/or multicast/key)

that enable access by the portable device 102 to the secure network. After access by the portable device 102 to the secure network is established, the portable device 102 may be moved away from the computation device 106, since the short distance communication link 104 is no longer needed by the portable device 102.

The session key(s) may be enabled according to one or more business policies. For example, one business policy may specify a time period (e.g., a first time period of a specified duration) during which access to the secure network is permitted and after which access to the secure network is denied. In an embodiment, the session key(s) may be renewable upon expiry of the first time period, e.g., by repeat of physical contact between the portable device and the computation device. Another business policy may specify a first geographical boundary of service. Note that other policies may be put in place and are not limited by the examples described herein.

Figure 2:
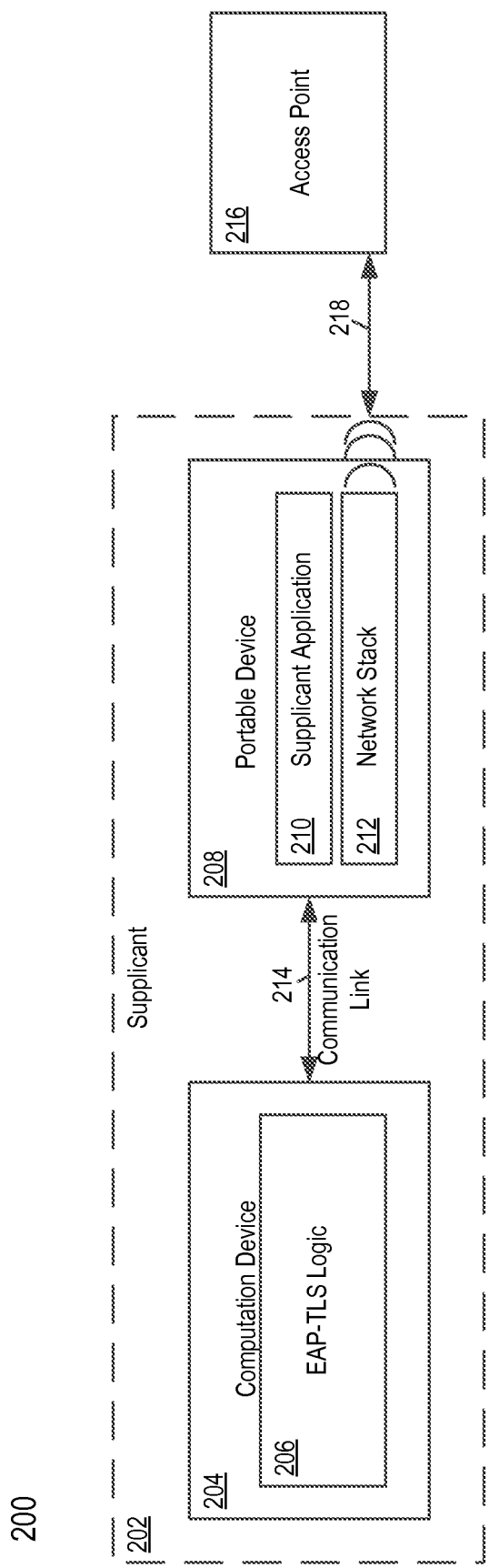
FIG. 2 a block diagram of a system that includes an internal architecture to authenticate a portable device to access a secure network, according to an embodiment of the present invention.

Referring to FIG. 2, shown is a block diagram of a system 200 that includes internal architecture to authenticate a portable device in order to access a secure network, according to an embodiment of the present invention. The system 200 includes a supplicant 202 and an access point 216. The supplicant 202 represents an entity at one end of a point-to-point wide area network (WAN) and that seeks to be authenticated by an authenticator (e.g., RADIUS server) attached to another end of the WAN.

In an embodiment, the supplicant 202 may include a portable device 208, such as a smart phone or other portable device. The supplicant 202 may also include a computation device such as a computation device 204. The computation device 204 may include EAP-TLS logic 210 that can access security information, e.g., X.509 certificate that may be stored in the computation device 204 or that is accessible by the computation device 204 and the EAP-TLS logic 210 may also perform digital encryption/decryption as part of an authentication exchange. The EAP-TLS logic 206 may include one or more of hardware, firmware, or software. The portable device 208 can include a supplicant application 210 and a network stack 212 to conduct communications with a secure network (not shown) via the access point 216.

In operation, the portable device 208 may initiate communication with the computation device 204 via a communication link 214, e.g., a near field communication link or Bluetooth communication link. In an embodiment, the communication may be initiated by, e.g., physical contact between the portable device 208 and the computation device 204, such as by a "tap" or "bump" of the portable device 208 and the computation device 204 (e.g., near field communication), or by placing the portable device 208 in close proximity to the computation device 204 (e.g., Bluetooth). For example, in one embodiment placement of the portable device 208 at a separation of approximately 5 centimeters or less from the computation device 204 may initiate the communication between the portable device 208 and the computation device 204. Other embodiments are contemplated and are not limited by examples provided herein.

Upon initiation of the communication between the portable device 208 and the computation device 204 via the communication link 214, the supplicant application 206 may be automatically launched. (Alternatively, the tap may result in initialization of the supplicant application 206). The network stack 212 of the portable device 208 may establish a wireless connection 218 with the access point 216 of the secure network.

The secure network may, upon establishment of the wireless connection 218, request secure identification data from the portable device 208 to enable secure network access by the portable device 208. The request may prompt the supplicant application 210 to query the computation device 204 (or may pass on the request to the computation device) to provide the secure identification data, e.g., an X.509 certificate that identifies the computation device 204. For example, the computation device 204 may be issued to a user and may store the X.509 certificate, which may indicate associate with the user, e.g., by association with the user's employee ID number.

The secure identification data may be transferred to the portable device 208, which can provide the requested secure identification data to the secure network via wireless connection 218 to the access point 216.

Upon verification of authentication of the portable device 208 by the secure network, the secure network may issue one or more session keys (e.g., unicast key, multicast key, etc.) to be sent to the portable device 208. The session key(s) upon receipt by the portable device 208 enables the portable device 208 to access the secure network.

Upon establishment of access to the secure network, the portable device 208 can be moved away from the computation device 204, as the communication link 214 is no longer needed to establish access by the portable device 208 to the secure network. Access to the secure network by the portable device may continue through the wireless connection 218, or via other access points or hotspots.

In an embodiment, prior to authentication of the portable device 208 to access the secure network, authorization of the portable device 208 may be carried out through, e.g., verification of a password that may be provided to the computation device 204 by, e.g., a user. The authorization can ensure that access to the secure network is not being provided to an unauthorized portable device, such as another portable device of another user. Other authorization techniques may be used, and the examples presented herein are not limiting in this regard.

Based on business needs, some policies with regard to use of the session key(s) may be put in place. For example, there may be a time duration after which one of the session keys expires. After expiry of the session key, the portable device 208 may re-activate the session key by, e.g., physical contact (e.g., tap or bump) of the portable device 208 with the computation device 204 and re-authentication of the portable device 208. Another policy may specify a maximum distance from the AP 216, beyond which one or more of the session keys no longer enables the portable device 208 to access the secure network. Note that the policies that may be invoked are not limited by the examples presented herein.

Figure 3:
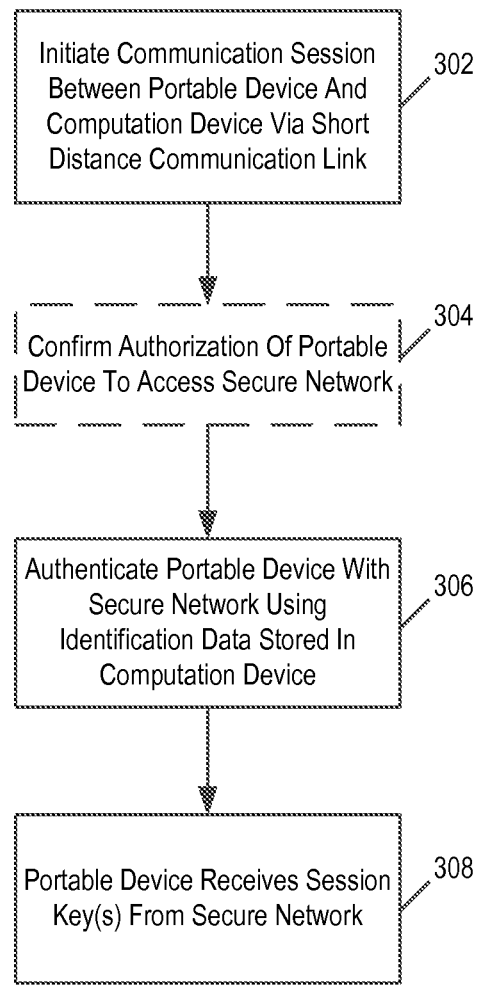
FIG. 3 is a flowchart of a method of authenticating a portable device to a secure network, according to an embodiment of the present invention.

Referring now to FIG. 3, shown is a flowchart of a method of authenticating a portable device to a secure network, according to an embodiment of the present invention. At block 302, a communication session is initiated between a computation device and a portable device via a short distance communication link. In one embodiment, the communication session may be initiated by physical contact, such as by a tap or bump between the portable device and the computation device (e.g., near field communication). Optionally, the tap (or bump) may also initialize a supplicant application to provide secure identification data to enable access by the portable device to a secure network. In another embodiment, establishment of the communication session of the portable device and the computation device automatically initializes the supplicant application.

Continuing to block 304, optionally the computation device may confirm authorization of the portable device to access the secure network based on, e.g., a password that may be provided by a user in response to a request issued by the computation device.

Advancing to block 306, the portable device may be authenticated by the secure network by providing to the secure network secure identification data that is retrieved by the portable device from the computation device and provided to the secure network by wireless connection of the portable device to an access point that couples to the secure network. For instance, the secure identification data may include an X.509 certificate that resides in the computation device of the user (who also owns the portable device). Advancing to block 308, the portable device may receive one or more session keys (e.g., a unicast key used for private messages between the portable device and an access point of the secure network and/or a multicast/global key to receive broadcast messages from the access point to the portable device) from the secure network that enables the portable device to access to the secure network.

Figure 4:
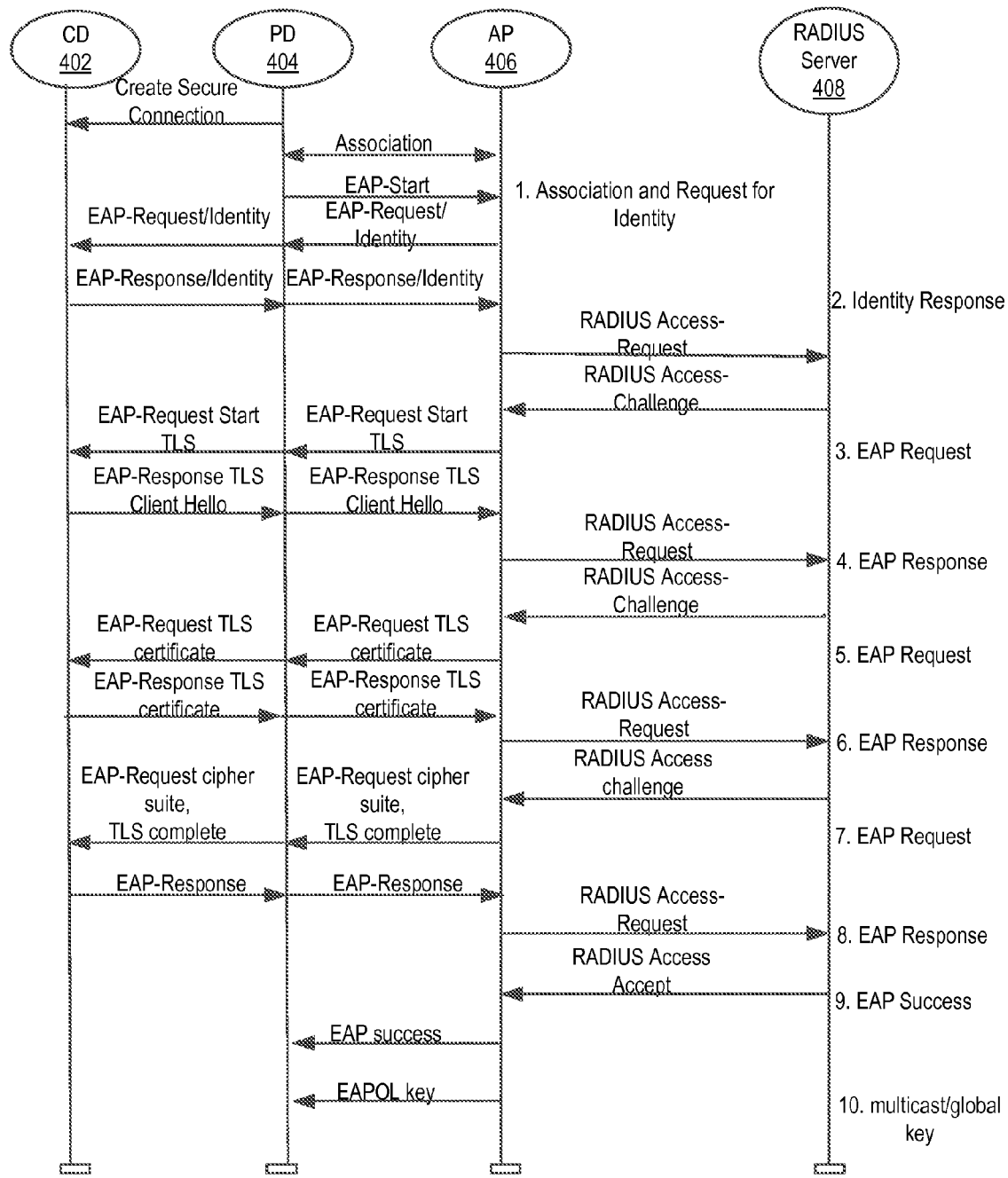
FIG. 4 is a ladder diagram that indicates a temporal progression of events in authentication of a portable device to enable access to a secure network, according to an embodiment of the present invention.

Referring now to FIG. 4, shown is a ladder diagram that indicates a temporal progression of events in authentication of a portable device to enable access to a secure network, according to an embodiment of the present invention. Stations involved in the authentication process may include a computation device (CD) 402 (e.g., laptop), a portable device (PD) 404 (e.g., smart phone), an access point (AP) 406, and a remote authentication dial in user service (RADIUS) server 408.

Stage 0: Initiate communication between PD 404 and CD 402 (e.g., via bump or tap, or proximity of PD 404 and CD 402). (Optionally user may be asked to input password in CD 402 to confirm authenticity of user).

Stage 1: Association of PD 404 and AP 406, and request for identity. When the PD 404 associates with the AP 406, PD 404 transmits an EAP-Start message. AP 406 receives the EAP-Start message from the PD 404 and transmits an EAP-Request/Identity message to the PD 404, which forwards to CD 402.

Stage 2: EAP-Response/Identity response. The CD 402 transmits an EAP-Response/Identity containing the user name to the PD 404, which forwards to the AP 406. The AP 406 forwards the EAP-Response/Identity message to the RADIUS server 408 in the form of a RADIUS Access-Request message.

Stage 3: EAP-Request from RADIUS server (Start TLS). The RADIUS server 408 sends a RADIUS Access-Challenge message containing an EAP-Request message (with the EAP-Type set to EAP-TLS logic of the CD 402), requesting a start to a TLS authentication process. The AP 406 forwards the EAP message to PD 404, which forwards the EAP message to CD 402.

Stage 4: EAP-Response from the wireless client (TLS Client Hello). The CD 402 sends to the PD 404 an EAP-Response message (with the EAP-Type set to EAP-TLS), indicating to the TLS client "hello". The PD 404 forwards the EAP message to the AP 406. The AP 406 forwards the EAP message to the RADIUS server 408 in the form of a RADIUS Access-Request message.

Stage 5: EAP Request from RADIUS server (RADIUS Server's Certificate). The RADIUS server 408 sends a RADIUS Access-Challenge message containing an EAP-Request message (with the EAP-Type set to EAP-TLS), and includes the RADIUS server's certificate chain. The AP forwards the EAP message to the PD 404, which forwards to the CD 402.

Stage 6: EAP-Response from the wireless client (Wireless Client's Certificate). The CD 402 sends to PD 404 an EAP-Response message (with the EAP-Type set to EAP-TLS) that includes the wireless client's certificate chain. PD 404 forwards to the AP 406. The AP 406 forwards the EAP message to the RADIUS server 408 in the form of a RADIUS Access-Request message.

Stage 7: EAP-Request from RADIUS server (Cipher suite, TLS complete). The RADIUS server sends another EAP-Request message (with the EAP-Type set to EAP-TLS) that includes the cipher suite and an indication that TLS authentication message exchanges are complete. The AP 406 forwards the EAP message to the PD 404. The PD 404 forwards the EAP message to the CD 402.

Stage 8: EAP-Response from the wireless client. The CD 402 sends to the PD 404 another EAP-Response message (with the EAP-Type set to EAP-TLS). The PD 404 forwards the message to the AP 406. The AP 406 forwards the EAP message to the RADIUS server 408 in the form of a RADIUS Access-Request message.

Stage 9: EAP-Success from RADIUS server. The RADIUS server 408 derives a per-client unicast session key and a signing key from the keying material that is a result of the EAP-TLS authentication process. Next, the RADIUS server 408 sends a RADIUS Access-Accept message containing an EAP-Success message and the MPPE-Send-Key and MPPE-Recv-Key attributes to the AP 406.

The AP 406 uses the key encrypted in the MS-MPPE-Send-Key attribute as the per-client unicast session key for data transmissions to the PD 404 (truncated to an appropriate Wired Equivalent Privacy (WEP) key length). The AP uses the key encrypted in the MS-MPPE-Recv-Key attribute as a signing key for data transmissions to the PD that require signing (truncated to the appropriate WEP key length).

The PD 404 derives the per-client unicast session key (the same value as the decrypted MS-MPPE-Send-Key attribute in the RADIUS message sent to the wireless AP 406) and the signing key (the same as value as the decrypted MS-MPPE-Recv-Key attribute in the RADIUS message sent to the wireless AP 406) from the keying material that is a result of the EAP-TLS authentication process. Therefore, the AP 406 and PD 404 use the same keys for both the encryption and signing of unicast data. The AP 406, on receiving the RADIUS server message, forwards the EAP-Success message to the PD 404. The EAP message does not contain the per-station unicast session or signing keys.

Stage 10: Multicast/global encryption key to the PD.

The AP 406 derives the multicast/global encryption key by generating a random number, or by selecting it from a previously set value. Next, the AP 406 sends an EAP over LAN (EAPOL)-Key message to the PD 404 containing the multicast/global key that is encrypted using the per-client unicast session key.

The Key field of the IEEE 802.1x EAPOL-Key message is RC4-encrypted using the per-client unicast session key and portions of the message, and is signed with HMAC-MD5 using the per-client unicast signing key. Upon receiving the EAPOL-Key message, the PD 404 uses the per-client unicast session key to verify the signed portions of the EAPOL-Key message and decrypt the multicast/global key.

Next, the wireless LAN network adapter driver indicates the per-client unicast session key, the per-client unicast signing key, and the multicast/global key to the wireless LAN network adapter. After the keys have been indicated, the PD 404 begins protocol configuration using the wireless adapter (such as using DHCP to obtain an IP address configuration).

When the AP 406 changes the multicast/global key, it generates and sends EAPOL-Key messages to PD. Each EAPOL-Key message contains the new multicast/global key encrypted with the particular wireless client's per-client unicast session key.

Figure 5:
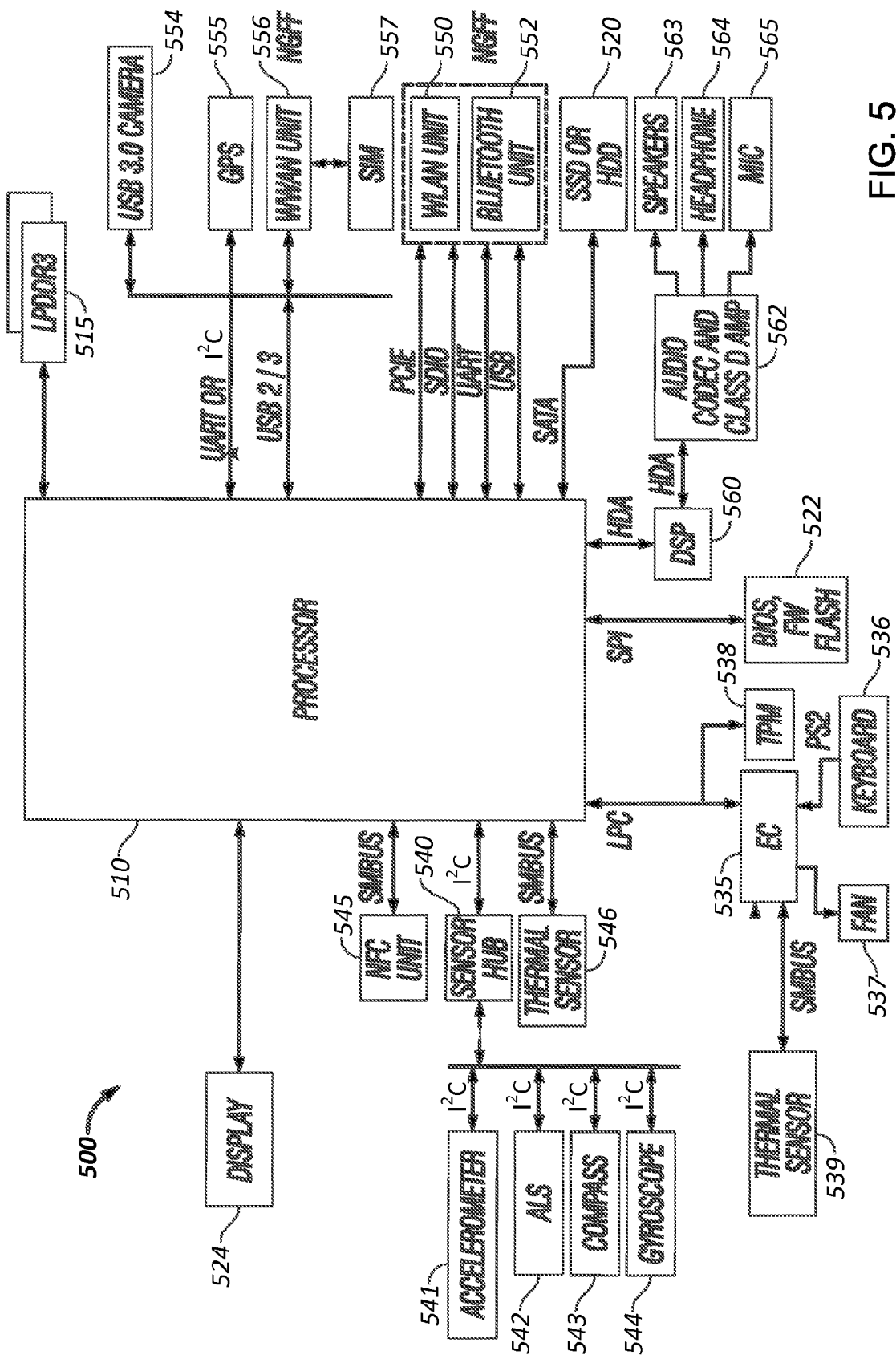
FIG. 5 is a block diagram of components present in a computer system in accordance with an embodiment of the present invention.

Referring now to FIG. 5, shown is a block diagram of components present in a computer system in accordance with an embodiment of the present invention. As shown in FIG. 5, system 500 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 5 is intended to show a high level view of many components of the computer system. However, it is to be understood that additional components may be present in certain implementations and furthermore, different arrangement of the components shown may occur in other implementations.

As seen in FIG. 5, a processor 510, which may be a low power multicore processor socket such as an ultra-low voltage processor, may act as a main processing unit and central hub for communication with the various components of the system. Such processor can be implemented as a system on a chip (SoC). In one embodiment, processor 510 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 processor.

Processor 510 may communicate with a system memory 515, which in an embodiment can be implemented via multiple memory devices to provide for a given amount of system memory, and can be coupled to processor 510 via one or more memory interconnects.

To provide for persistent storage of information such as data, applications, one or more operating systems and so forth, a mass storage 520 may also couple to processor 510. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of solid state drive (SSD) storage to act as a SSD cache to enable non-volatile storage of context state and other such information during power down events so that a fast power up can occur on re-initiation of system activities. Also shown in FIG. 5, a flash device 522 may be coupled to processor 510, e.g., via a serial peripheral interface (SPI). This flash device may provide for non-volatile storage of system software, including a basic input/output software (BIOS) as well as other firmware of the system.

Various input/output (IO) devices may be present within system 500. Specifically shown in the embodiment of FIG. 5 is a display 524 which may be a high definition LCD or LED panel configured within a lid portion of the chassis.

For perceptual computing and other purposes, various sensors may be present within the system and can be coupled to processor 510 in different manners. Certain inertial and environmental sensors may couple to processor 510 through a sensor hub 540, e.g., via an $I^2C$ interconnect. In the embodiment shown in FIG. 5, these sensors may include an accelerometer 541, an ambient light sensor (ALS) 542, a compass 543 and a gyroscope 544. Other environmental sensors may include one or more thermal sensors 546 which may couple to processor 510 via a system management bus (SMBus) bus, in one embodiment.

Also seen in FIG. 5, various peripheral devices may couple to processor 510 via a low pin count (LPC) interconnect. In the embodiment shown, various components can be coupled through an embedded controller 535. Such components can include a keyboard 536 (e.g., coupled via a PS2 interface), a fan 537, and a thermal sensor 539. In some embodiments, touch pad 530 may also couple to EC 535 via a PS2 interface. In addition, a security processor such as a trusted platform module (TPM) 538 in accordance with the Trusted Computing Group (TCG) TPM Specification Version 1.2, dated Oct. 2, 2003, may also couple to processor 510 via this LPC interconnect.

System 500 can communicate with external devices in a variety of manners, including wirelessly. In the embodiment shown in FIG. 5, various wireless modules, each of which can correspond to a radio configured for a particular wireless communication protocol, are present. One manner for wireless communication in a short range such as a near field may be via a near field communication (NFC) unit 545 which may communicate, in one embodiment with processor 510 via an SMBus. Note that via this NFC unit 545, devices in close proximity to each other can communicate. For example, a user can enable system 500 to communicate with a computation device, (e.g., a laptop computer, which may have been issued to the user), via adapting the two devices together in close relation and enabling transfer of information such as identification information to be provided by the computation device to the system 500 to enable access by the system 500 to a secure network, in accordance with embodiments of the present invention.

As further seen in FIG. 5, additional wireless units can include other short range wireless engines including a WLAN unit 550 and a Bluetooth unit 552. The Bluetooth unit 552 may be used to communicate with a computation device, (e.g., a laptop computer, which may have been issued to the user), via adapting the two devices together in close relation and enabling transfer of information such as identification information to be provided by the computation device to the system 500 to enable access by the system 500 to a secure network, in accordance with embodiments of the present invention.

The WLAN unit 550 may be used to communicate with the secure network in accordance with embodiments of the present invention. Using WLAN unit 550, Wi-Fi™ communications in accordance with a given Institute of Electrical and Electronics Engineers (IEEE) 802.11 standard can be realized, while via Bluetooth unit 552, short range communications via a Bluetooth protocol can occur. These units may communicate with processor 510 via, e.g., a USB link or a universal asynchronous receiver transmitter (UART) link. Or these units may couple to processor 510 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications, e.g., according to a cellular or other wireless wide area protocol, can occur via a WWAN unit 556 which in turn may couple to a subscriber identity module (SIM) 557. In addition, to enable receipt and use of location information, a GPS module 555 may also be present. Note that in the embodiment shown in FIG. 5, WWAN unit 556 and an integrated capture device such as a camera module 554 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 560, which may couple to processor 510 via a high definition audio (HDA) link. Similarly, DSP 560 may communicate with an integrated coder/decoder (CODEC) and amplifier 562 that in turn may couple to output speakers 563 which may be implemented within the chassis. Similarly, amplifier and CODEC 562 can be coupled to receive audio inputs from a microphone 565 which in an embodiment can be implemented via dual array microphones to provide for high quality audio inputs to enable voice-activated control of various operations within the system. Note also that audio outputs can be provided from amplifier/CODEC 562 to a headphone jack 564. Although shown with these particular components in the embodiment of FIG. 5, understand the scope of the present invention is not limited in this regard.

Figure 6:
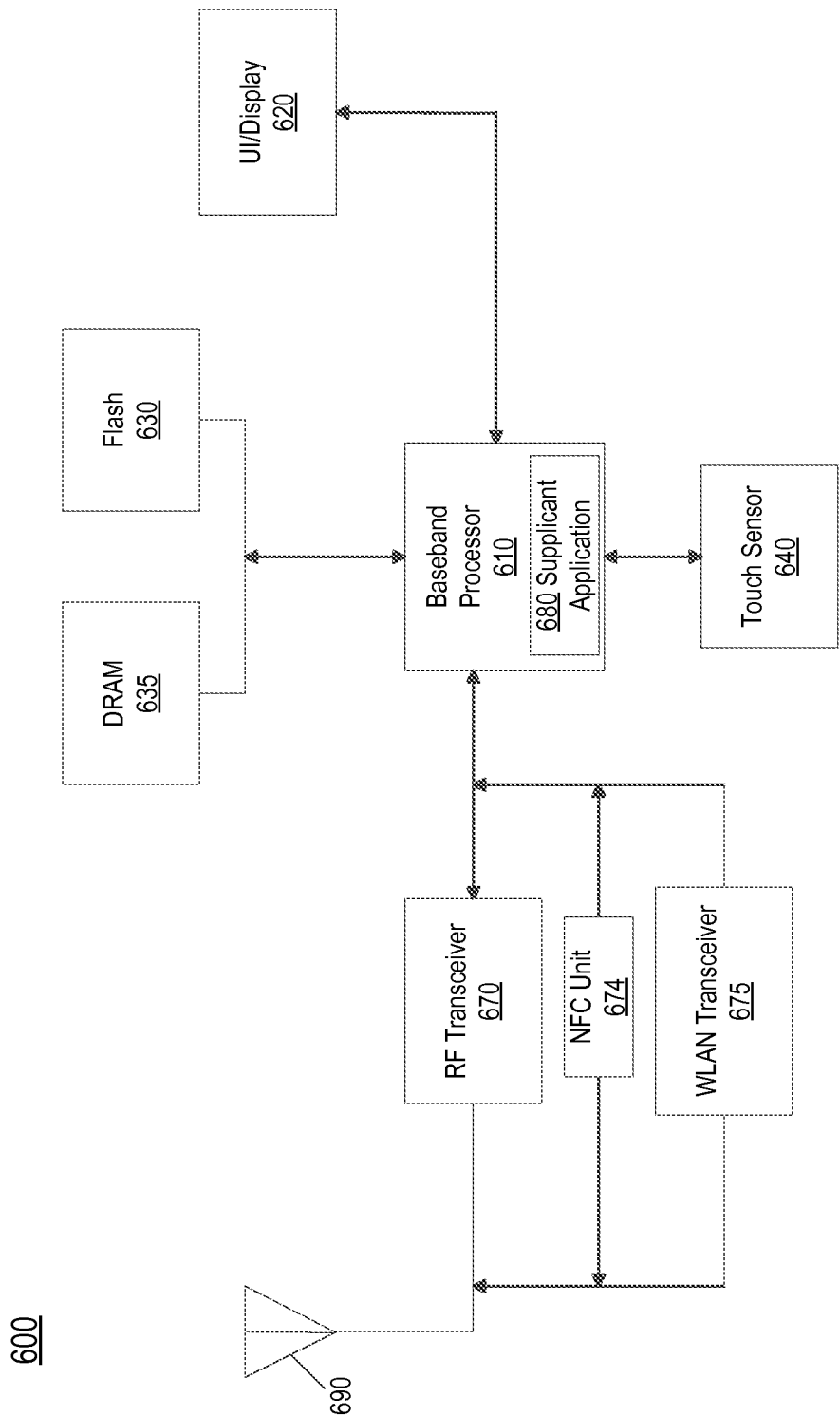
FIG. 6 is a block diagram of an example system with which embodiments can be used.

Embodiments can be used in many different environments. Referring now to FIG. 6, shown is a block diagram of an example system 600 with which embodiments can be used. As seen, system 600 may be a smartphone or other wireless communicator. As shown in the block diagram of FIG. 6, system 600 may include a baseband processor 610 which can include one or more cores. In general, baseband processor 610 can perform various signal processing with regard to communications, as well as perform computing operations for the device. For example, the baseband processor 610 may execute a supplicant application 680 that may effect transfer of identification information received from, e.g., a computation device such as a laptop computer, to a secure network to enable access to the secure network by the system 600, in accordance with embodiments of the present invention.

In turn, baseband processor 610 can couple to a user interface/display 620 which can be realized, in some embodiments with inclusion of a hybrid touchpad as described herein. In addition, baseband processor 610 may couple to a memory system including, in the embodiment of FIG. 6 a non-volatile memory, namely a flash memory 630 and a system memory, namely a dynamic random access memory (DRAM) 635. As further seen, baseband processor 610 can further couple to a capture device 640 such as an image capture device that can record video and/or still images.

To enable communications to be transmitted and received, various circuitry may be coupled between baseband processor 610 and an antenna 690. Specifically, a radio frequency (RF) transceiver 670 and a wireless local area network (WLAN) transceiver 675 may be present. In general, RF transceiver 670 may be used to protocol.

A near field communication unit 674 may be present and may facilitate communication between the system 600 and a computation device to, e.g., retrieve identification data from the computation device, in accordance with embodiments of the present invention. In addition, via WLAN transceiver 675, local wireless signals, such as according to an IEEE 802.11 standard such as IEEE 802.11a/b/g/n can also be realized to, e.g., communicate with a secure network and to provide identification data to the secure network in order to enable access by the system 600 to the secure network, in accordance with embodiments of the present invention. Although shown at this high level in the embodiment of FIG. 6, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computation device, cause the device to carry out one or more of the methods and techniques described herein.

The following examples pertain to further embodiments. In an embodiment, a device includes a processor to initialize a first wireless communication path with a computation device, initialize a second wireless communication path with a secure network, and receive a first request for identification data from the secure network via the second wireless communication path to enable access to the secure network. The processor is further to automatically pass the received request data to the computation device via the first wireless communication path, receive the identification data from the computation device responsive to the request and provide the received identification data to the secure network via the second wireless communication path, and receive a session key at the device from the secure network that enables the device to access the secure network.

In an embodiment, the identification data is received from the computation device responsive to a confirmation, determined from user input, and that indicates the device is authorized to access the secure network.

In an embodiment, the first communication is initiated by physical contact between the device and the computation device.

In an embodiment, the session key enables access by the device to the secure network for a first time period that is renewable upon expiry of the first time period by additional physical contact between the device with the computation device.

In an embodiment, the session key enables access by the device to the secure network within a first geographical region outside of which the access is denied.

In an embodiment, the identification data includes a secure certificate associated with a user of the device, the secure certificate accessible by the computation device.

In an embodiment, at least one computer-readable storage medium has instructions stored thereon for causing a system to initiate first communication with a computation means via a first wireless communication path, initiate second communication with a secure network via a second wireless communication path, and receive a request of identification data from the secure network via the second wireless communication path to enable the system to access the secure network. Also included are instructions to automatically pass the received request to the computation means and retrieve the identification data from the computation means via the first wireless communication path, provide the retrieved identification data retrieved from the system to the secure network via the second wireless communication path, and receive a session key at the system from secure network via the second wireless communication path in response to providing the identification data to the secure network, where the session key enables the system to access the secure network.

In an embodiment, the first wireless communication path includes a near field communication path and initiation is effected by physical contact between the computation means and the system.

In an embodiment, the session key enables the access by the system to the secure network for a first time period after which the access is denied.

In an embodiment, also included are instructions to renew the access by the system to the secure network upon expiry of the first time period by initiation of physical contact of the system with the computation device.

In an embodiment, the session key enables the access by the system to the secure network within a first geographical region outside of which access by the system to the secure network is denied.

In an embodiment, also stored are instructions to, responsive to initiation of the first communication, receive confirmation from the computation means, of authorization of the system to access a secure network. The confirmation includes verification of a match of a security code provided by a user to a reference security code accessible by the computation means.

In an embodiment, a method includes initiating first communication by a portable device with a computation device via a first wireless communication path, initiating second communication by the portable device with a secure network via a second wireless communication path in response to a request received from the secure network via the second communication path to provide identification data, and forwarding, by the portable device, the request to the computation device via the first communication path. The method further includes receiving, at the portable device, the identification data from the computation device in response to the request via the first wireless communication path, providing the identification data to the secure network by the portable device via the second wireless communication path, and receiving a session key by the portable device from the secure network via the second wireless communication path responsive to providing the identification data, the session key enabling the portable device to access the secure network.

In an embodiment, the first wireless communication path is a near field communication path and communication is initiated by physical contact of the portable device with the computation device.

In an embodiment, prior to providing the identification data, the portable device is confirmed as authorized to access the secure network.

In an embodiment, the confirmation is effected via a password received from a user.

In an embodiment, the first wireless communication path is a Bluetooth link and communication is initiated by physical placement of the portable device within a first distance with respect to the computation device.

In an embodiment, the session key enables access by the portable device to the secure network for a first time period after which the access is denied.

In an embodiment, the method includes renewing the access by the portable device to the secure network upon expiry of the first time period by re-initiating communication by the portable device with the computation device.

In an embodiment, the session key enables access by the portable device to the secure network within a first geographical region outside of which the access is denied.

In an embodiment, a communication means for accessing a secure network is configured to initiate first communication with a computation device via a first wireless communication path, initiate second communication with a secure network via a second wireless communication path, receive a request of identification data from the secure network via the second wireless communication path to enable the system to access the secure network, and automatically pass the received request to the computation device and retrieve the identification data from the computation device via the first wireless communication path. The communication means is further to provide the retrieved identification data to the secure network via the second wireless communication path, and receive a session key at the system from secure network via the second wireless communication path in response to providing the identification data to the secure network, where the session key enables the system to access the secure network.

In an embodiment, the first wireless communication path includes a near field communication path and initiation is effected by physical contact of the computation device and the communication means.

In an embodiment, the session key enables the access by the communication means to the secure network for a first time period after which the access is denied.

In an embodiment, the access by the communication means to the secure network is renewed upon expiry of the first time period by initiation of physical contact of the communication means with the computation device.

In an embodiment, the session key enables the access by the communication means to the secure network within a first geographical region outside of which access by the communication means to the secure network is denied.

In an embodiment, the communication means, responsive to initiation of the first communication, is to receive confirmation, from the computation device, of authorization of the communication means to access a secure network. The confirmation may include verification of a match of a security code provided by a user to a reference security code accessible by the computation device.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A device comprising:
    a processor to:
        initialize a first wireless communication path with a computation device and initialize a second wireless communication path with a secure network, wherein the first wireless communication path is to be initialized via physical contact between the device and the computation device;

receive a request for identification data from the secure network via the second wireless communication path to enable access by the device to the secure network;

automatically pass the request to the computation device via the first wireless communication path;

receive the identification data from the computation device responsive to the request and provide the identification data to the secure network via the second wireless communication path; and responsive to provision of the identification data to the secure network, receive a session key at the device from the secure network to enable the device to access the secure network.

2. The device of claim 1, wherein the identification data is to be received from the computation device further responsive to a confirmation, determined from user input, to indicate that the device is authorized to access the secure network.

3. The device of claim 1, wherein the identification data is to include a secure certificate associated with a user of the device.

4. The device of claim 1, wherein the identification data is to include a security code associated with a user of the device.

5. The device of claim 1, wherein the session key is to enable access by the device to the secure network for a first time period that is renewable upon expiry of the first time period by additional physical contact of the device with the computation device.

6. The device of claim 1, wherein the session key is to enable access by the device to the secure network within a first geographical region outside of which the access is to be denied.

7. At least one non-transitory computer-readable storage medium having instructions stored thereon for causing a portable device to:

initiate first communication with a computation device by a portable device via a first wireless communication path, wherein initiation of the first communication is to include physical contact of the computation device and the portable device;

initiate second communication with a secure network by the portable device via a second wireless communication path;

receive a request of identification data from the secure network at the portable device via the second wireless communication path to enable the portable device to access the secure network;

automatically pass the request from the portable device to the computation device and responsive to passing the request, receive at the portable device the identification data from the computation device via the first wireless communication path;

provide the identification data from the portable device to the secure network via the second wireless communication path; and receive a session key at the portable device from the secure network via the second wireless communication path in response to providing the identification data to the secure network, wherein the session key is to enable the portable device to access the secure network.

8. The at least one computer-readable storage medium of claim 7, wherein the initiation of the first communication is to be effected by momentary physical contact of the computation device and the portable device.

9. The at least one computer-readable storage medium of claim 7, including instructions to, responsive to initiation of the first communication and prior to receipt of the identification data by the portable device, receive confirmation from the computation device of authorization of the portable device to access the secure network, wherein the confirmation includes verification of a match of a security code to be provided by a user to a reference security code accessible by the computation device.

10. The at least one computer-readable storage medium of claim 7, wherein the session key is to enable access by the portable device to the secure network for a first time period after which the access to the secure network is to be denied.

11. The at least one computer-readable storage medium of claim 10, wherein the access by the portable device to the secure network upon expiry of the first time period is to be renewed by additional physical contact of the portable device with the computation device.

12. The at least one computer-readable storage medium of claim 7, wherein receipt by the portable device of the session key is to enable access by the portable device to the secure network within a first geographical region outside of which the access by the portable device to the secure network is to be denied.

13. A method comprising:

initiating a first communication by a portable device with a computation device via a first wireless communication path, wherein the first communication is to be initiated by a first physical contact of the portable device with the computation device;

initiating a second communication by the portable device with a secure network via a second wireless communication path;

in response to a request received from the secure network via the second wireless communication path to provide identification data, forwarding, by the portable device, the request to the computation device via the first wireless communication path;

receiving, at the portable device, the identification data from the computation device in response to the request via the first wireless communication path;

providing the identification data to the secure network by the portable device via the second wireless communication path; and receiving a session key by the portable device from the secure network via the second wireless communication path responsive to providing the identification data, the session key to enable the portable device to access the secure network.

14. The method of claim 13, wherein the first communication is to be initiated by momentary physical contact of the portable device with the computation device.

15. The method of claim 13, wherein prior to providing the identification data, the portable device is to be confirmed as authorized to access the secure network.

16. The method of claim 15, wherein confirmation is to be effected via a password to be received from a user.

17. The method of claim 13, wherein the first wireless communication path is to include a Bluetooth link.

18. The method of claim 13, wherein the session key is to enable access by the portable device to the secure network for a first time period after which the access by the portable device to the secure network is to be denied.

19. The method of claim 18, further comprising renewing the access by the portable device to the secure network upon expiry of the first time period by re-initiating communication by the portable device with the computation device.

20. The method of claim 13, wherein the session key is to enable access by the portable device to the secure network within a first geographical region outside of which the access is to be denied.

* * * * *